Figure 1:
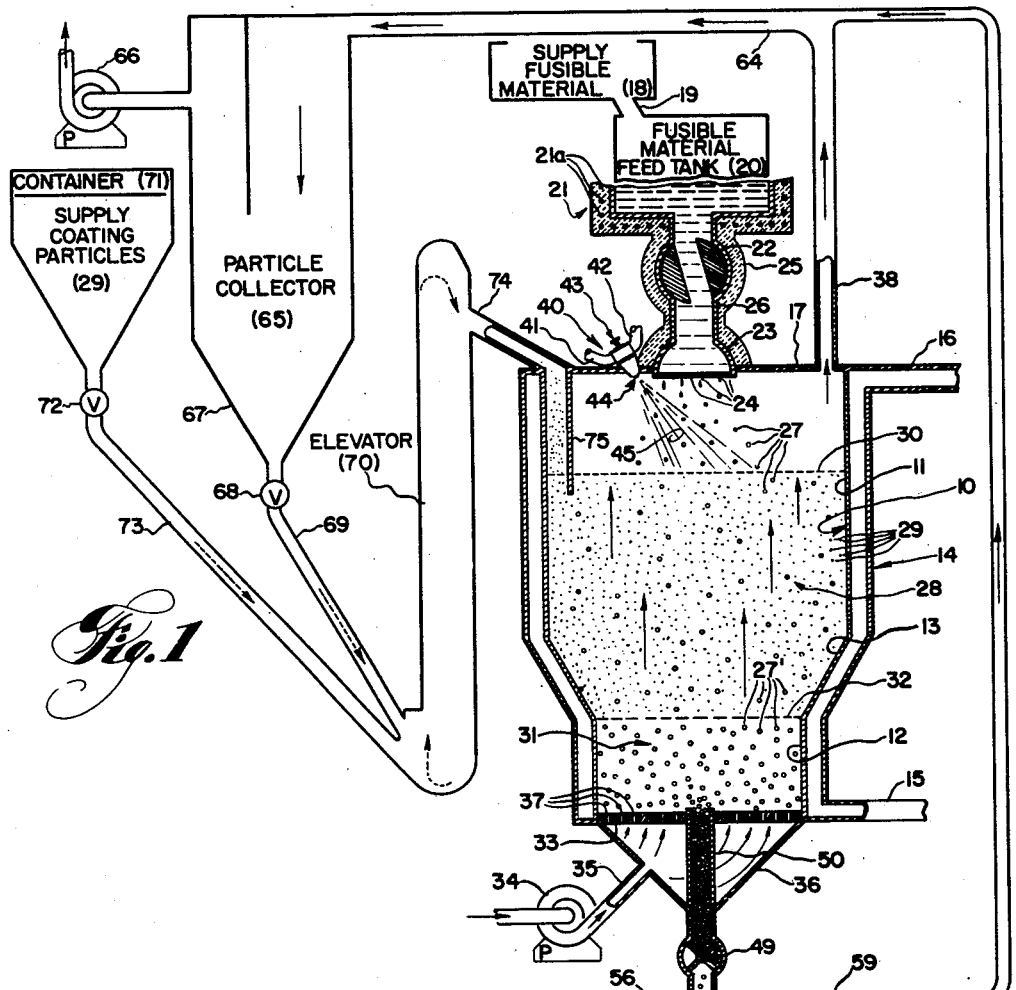

May 29, 1962 H. NACK 3,036,338
COATING AND PELLETIZING OF FUSIBLE MATERIALS
Filed Jan. 8, 1959

3,036,338
COATING AND PELLETIZING OF FUSIBLE
MATERIALS
Herman Nack, Columbus, Ohio, assignor, by mesne assignments, to G & A Laboratories, Inc., Savannah, Ga., a corporation of Georgia
Filed Jan. 8, 1959, Ser. No. 785,711
3 Claims. (Cl. 18—47.2)

This invention relates to production of coated solid pellets of fustible materials. More particularly, the invention relates to a method of pelletizing and coating fusible materials in a liquid-spray-cooled, gas-fluidized bed ot finely divided coating solids.

Heretofore fusible materials have been produced in pellet form by several methods. In one method, commonly called prilling, molten droplets of the fusible material fall through a tall tower containing air at a temperature lower than that of the entering droplets. The droplets are cooled by the air during their fall so that, upon reaching the bottom of the tower, the droplets are congealed sufficiently to be resistant to breakage and deformation. A variation of prilling is the method of shot formation in which a tank of a liquid is positioned at the bottom of the tower to receive the congealed droplets. The liquid serves to cushion the fall of the congealed, or partially congealed, droplets and to provide additional cooling for the droplets. Disadvantages of these methods include the necessity for high cooling towers (sometimes as high as 200 feet) together with the need for pumping fusible materials to the top of such towers. Also, when coated pellets of fusible materials are desired, it is necessary to provide additional operations, such as tumbling the congealed droplets prepared by either of these processes with a finely divided coating material in a coating drum, to coat the droplets. Coated pellets from such processes have a coating which is poorly bonded to the pellet and easily removed upon handling. Loss of coating material from such coated pellets decreases the effectiveness of the coating and creates a troublesome and annoying dust problem.

In another method used heretofore for the manufacture of pellets from fusible materials, molten droplets of the fusible material are caused to contact a cold surface on which the droplets are congealed, or frozen. Pellets from such a process are seldom substantially spherical in shape, and this process requires careful and accurate control of the feed of molten material to avoid excessive deformation of the droplet upon impact with the cold surface. In another method, a molten fusible material is sprayed on a bed of particulate material which may be a fixed bed of material. More frequently, the bed of particulate material is a moving bed in which the particles are substantially fixed in position with respect to each other, but move with respect to the molten fusible material contacting the bed. These processes have the disadvantages of inefficient cooling of the pellets and, generally some deformation of the pellets upon impact. These processes may produce pellets having some coating material clinging thereto. However, large amounts of particulate coating material are required because of generally slow cooling rates for the pellets. Additionally, such pellets are not uniformly coated but, instead, have a heavier coating on the bottom than on the top of the pellet.

In copending application, Serial No. 785,712, entitled "Coating and Pelletizing of Fusible Materials" filed of even date, it has been found that difficulties of prior art methods can be avoided and that substantially spherical, solid pellets of fusible materials may be prepared with a uniform adherent coating of finely divided particles of a solid material. The process of the copending application employs an apparatus containing upper and lower fluidized beds which are maintained in a fluidized state by the same current of fluidizing gas. The process uses an upper fluidized bed of the finely divided solids to coat molten droplets of the fusible material and a lower fluidized bed of the coated, solid droplets or pellets, to cool and clean the coated pellets. Fluidization of both the lower and upper beds is maintained by the current of fluidization gas which flows upward through the lower and upper beds. The process requires a velocity of the fluidizing gas high enough to fluidize the coated pellets and a temperature of the gas low enough to cool the coated pellets during the hold-up time in the fluidized bed of pellets to a point where the coated pellets resist deformation upon routine handling.

The gas velocity in the fluidized pellet bed, while high enough to maintain fluidization thereof, is not so high as to blow, or carry, an appreciable amount of pellets out of the bed of fluidized pellets upwards into the upper fluidized bed. The gas velocity in the upper fluidized bed, while high enough to maintain fluidization thereof, is not so high as to carry appreciable amounts of solids out of the upper fluidized bed and to eliminate the observable upper free surface or boundary zone of the bed. To achieve the required velocities for fluidization of both the upper and lower beds from the same current of fluidizing gas, there is provided a cross-sectional area of the fluidized bed of pellets that is smaller than the cross-sectional area of the fluidized bed of solids. The apparatus utilized for carrying out the process provides the needed difference in cross-sectional areas of the two fluidization zones and desirably provides a tapered transitional section to join and smoothly blend the lower zone with the upper zone to avoid dead spots in the apparatus during operation. The velocity required for fluidization of the bed of the coated pellets, which are larger in size than the coating solids, is larger than the velocity required to fluidize the bed of coating solids, which are fluidized best at relatively low velocities. It is to be understood that the velocities which are referred to are the space velocities of the gas. The space velocities of the gas are the calculated and actual velocities of a gas flowing upward in the fluidization apparatus, when the apparatus is devoid of droplets, solids, and pellets, with no allowance being made for the volume changes of the beds of solids and pellets. Generally, the velocity employed in the fluidized pellet bed provides a gentle fluidization (i.e., a velocity slightly greater than the minimum velocity required to fluidize the pellets). Control of the velocity is important to minimize the hold-up time of the droplets passing through the fluidized particle bed to avoid distortion and agglomeration of partially congealed droplets within this bed.

In the fluidized beds, the upwardly flowing fluidizing gas expands the bed of pellets and the bed of solids so that the packing arrangements of the pellets and also the solids becomes more open. With almost satisfactory fluidizing gas velocities, in the absence of channeling, the pressure drop through the lower bed almost equals the net effective weight of the pellets per unit area of the bed and through the upper bed almost equals the net effective weight of the solids per unit area of the bed. With slightly higher velocities, sufficient and satisfactory velocities are obtained for the process, since the pellets and solids then are fully supported and the beds are fluidized. Each fluidized bed is a mass of solids, or pellets, in the fluidizing gas and exhibits the liquid like characteristics of mobility, hydrostatic pressure, and an observable upper free surface or boundary zone, across which a marked change in concentration of the solids, or pellets, occurs. In the fluidized beds, the random motion of the pellets and solids increases with an increase in the velocity of the fluidizing gas.

In the process, molten droplets of the fusible material are formed and introduced into the fluidized solids bed through the upper free surface of the bed. The bed is maintained at a temperature below the temperature of the introduced molten droplets by control of the temperature of the fluidizing gas and, if desired, by maintenance of the temperature of the fluidized beds by auxiliary cooling means, such as a water-cooled jacket surrounding the portion of the apparatus enclosing the fluidized bed of solids. This temperature should be below the congealing temperature of the fusible material to provide for removal of heat of fusion of the droplets. The temperature has a pronounced effect on the amount of coating agent that adheres to the molten droplet, with the amount increasing with increasing bed temperatures and decreasing with decreasing bed temperatures. As the molten droplets pass through the upper bed, they are simulanteously coated with solids and congealed. The congealed, coated droplets, due to a larger size relative to the solids in the bed, drop out of the fluidized solids bed and enter the lower fluidized bed, which is located below the upper fluidized bed of solids and which contains solidified, coated droplets, or pellets. The lower, or fluidized pellet bed, is maintained in its fluidized state by the upward flowing current of fluidizing gas, which is the same current of gas which subsequently flows upward through the fluidized solids bed to maintain it in its fluidized state. The coated, congealed droplets entering the top of the fluidized pellet bed, while within this bed cool further and lose additional internal heat without distortion of the congealed form. Additionally, coating solids loosely adhering to the pellets are removed by the elutriating action of the fluidizing gas and are carried by the gas upward into the fluidized solids bed to provide cleaned, coated solid pellets. The apparatus provides a means for removal of pellets from the fluidized pellet bed. This means has an opening into the bed of fluidized pellets through which pellets may be removed in a continuous, or a batch, manner. The coated solid pellets of the fusible material, that are withdrawn through the removal means from the fluidized pellet bed, provide a substantially dust-free product consisting of substantially spherical pellets having a uniform, adherent coating of the finely divided solids of coating material.

In the practice of the process, the fluidizing gas is introduced into the bottom of the fluidized pellet bed, flows upward through this bed, leaves this bed at its upper free surface, enters the fluidized solids bed, flows upward through this bed, leaves this bed at its upper free surface, and exits from the apparatus near the top through a means provided for gas removal. Any solids entrained in the removed fluidizing gas may, if desired, be separated from the gas by a suitable means, such as a cyclone. The solids so separated may be re-employed in the process. Also the gas may be recirculated in the process by providing appropriate means, although it is necessary to increase the rate of flow by a suitable means and also to cool the gas.

Generally, an air distribution plate, which is a perforated plate or screen having the perforations spaced uniformly over the plate, is employed as a distributing means for the fluidizing gas and is located at or near the lower edge of the zone of fluidized pellets. If a distribution plate is not used to assure good fluidization, the fluidizing gas may be introduced into the apparatus and the lower edge of the zone of fluidized pellets through a plurality of openings in a conical gas plenum section of the apparatus. Preferably, a distributor plate is employed in the apparatus. Absence of a distributor plate results in reduced maximum production rates and, unless the gas introduction is carefully controlled, excessive amounts of pellets may be carried upward into the fluidized particle bed with subsequent deformation and agglomeration of the pellets and possible plugging of the bed.

While the process disclosed in the copending application represents an important advance in the art, it has been found that by direct liquid-spray cooling of the finely divided coating solids in the fluidized solids bed, there may be provided increased maximum production rates with a significant increase in the amount of coated pellets per unit of time that may be produced without increasing the size of the apparatus.

It is an object of this invention to provide a process and apparatus that overcomes disadvantages of prior art methods for production of coated pellets of fusible materials. Another object is to provide a process and apparatus superior to those disclosed in the copending application. An important object is to provide a liquid spray to contact the finely divided solids in the fluidized solids bed to cool the solids, and, thus, without increasing the size of the apparatus permit an increased rate of maximum production of coated pellets that is many times greater than that obtainable without the liquid spray. Still other objects and advantages of the invention will be apparent from the disclosure and examples that follow.

The process of this invention comprises applying a liquid spray to contact finely divided solids of a fluidized solids bed. In the process, the finely divided solids are maintained in a fluidized state by an upwardly flowing fluidizing gas. The liquid spray is directed generally downward to contact the finely divided solids. The liquid spray, depending on the temperature of the fluidized bed of finely divided solids, may comprise fine streams or atomized droplets with the amount of spray being insufficient to exceed the dew point of the fluidizing gas at the process conditions. The liquid spray droplets or streams vaporize with the latent heat for vaporization obtained from the finely divided solids and the fluidizing gas and, thus, cool the solids and gas. The upwardly flowing fluidizing gas functions as a carrier to remove the vaporized liquid. In a process for production of coated pellets of fusible materials by introducing molten droplets of fusible material into a fluidized bed of coating solids, the process of the invention includes spraying a liquid in the form of fine streams or atomized droplets onto the upper free surface of the fluidized solids bed, vaporizing the sprayed liquid and removing the vaporized liquid along with the fluidizing gas passing from the fluidized solids bed.

The fluidization gas for the process may be any gaseous substance which is inert to the liquid spray, the fusible material, and the coating solids under the conditions, such as temperature and pressure, of the process. In most cases, air may be used. If, however, owing to the nature of the fusible material or the coating solids, the presence of oxygen is undesirable, a fluidizing gas which contains no free oxygen, such as carbon dioxide, or nitrogen, may be used instead of air.

By "finely divided coating solids" is meant solid substances, whose individual particles are either regular or irregular in shape, have a maximum dimension no larger than the diameter of the molten droplets, and are solids under the process conditions. When the true density of such solid substances equals, or is greater than, the true density of the fusible material, the particle size should be considerably smaller than the size of the droplets to permit separation of loosely adhering coated particles and carrying upwards of such particles from the fluidized pellet bed. Preferably, the particles are smaller than 70 mesh (U.S. Bur. Stds. sieve series), although somewhat larger particles of coating solids may be used in some instances. The finely divided coating solids include inorganic and organic materials. The coating solids may comprise finely divided particles of the fusible material. Included among the suitable finely divided coating solids are clays, natural and synthetic resins, limestone, fertilizer materials, talc, diatomaceous earth, zein, calcium carbonate, and the like. The fluidized solids bed may, if desired, comprise particles of more than one of the suitable solids. The nature of the coating particles, their size, form, and surface conditions may affect the ease with which a bed of the same may be fluidized and, in some instances, may result in an unstable or agglomerating condition that makes fluidization difficult. Desirably, the particular bed of particles to be employed in the process is evaluated as to suitable fluidization conditions in a small fluidization apparatus prior to practice of the process in an appropriate apparatus. In most cases, a range in the size of the coating solids facilitates fluidization. Extremely fine particles (i.e., less than 325 mesh) tend to be difficult to fluidize. Addition of particles, ranging from 325 mesh to about 65 mesh, to such fine particles frequently improves the ability to fluidize the extremely fine particles.

The fusible material should be of such a nature, that it may be liquefied by the application of heat and prepared in the form of droplets. Suitable fusible materials are liquid at elevated temperatures and solid at atmospheric temperatures. Included among the suitable fusible materials are rosin, ammonium nitrate, asphalt, synthetic hydrocarbon resins, natural and synthetic waxes, and many other fusible substances, which are well known and of obvious utility for the process of the invention. Rosin is useful as an additive in glue, sizing, and soap compositions, ammonium nitrate in fertilizer compositions, asphalt in paving compositions, etc. For additive purposes, these materials desirably are in a divided state, such as pellets, rather than in a massive state. Thus, with pellets there exists no need to subdivide the fusible material before addition. Particularly desirable are such materials in the form of substantially spherical, coated pellets. Such pellets are aesthetically pleasing, easily handled, readily stored, and even after storage remain in a free-flowing condition. A rosin-clay product, such as disclosed in U.S. Patent 2,797,211, with a free-flowing condition even after storage, may be prepared by the present process.

The liquid employed for the liquid spray should be compatible and nonreactive with the fusible material, the finely divided coating solids, and the fluidization gas under the process conditions, such as temperature and pressure. Such a liquid should be readily vaporizable at temperatures lower than the liquefaction temperatures of the fusible material and desirably have a high latent heat of vaporization. Desirably, the liquid is a safe, nontoxic material, existing in the liquid state at atmospheric pressures and environmental temperatures. For most purposes, water is the preferred liquid. Other liquids, such as methyl alcohol, ethyl alcohol, acetone, ether, and the like, are useful along with many fusible materials, but for economic operation of the process require a means for recovery of the liquid vapors from the existing fluidizing gas.

The process may be carried out batchwise, intermittently, or continuously. Various apparatuses may be used. A preferred apparatus is illustrated in the attached drawings. For the sake of clearness and simplicity, many auxilitry items, such as vents, gauges, flowmeters, temperature controls, valves, supporting means, etc., have been illustrated by symbols or omitted from the drawings, as will be obvious to those skilled in the art.

Figure 2:
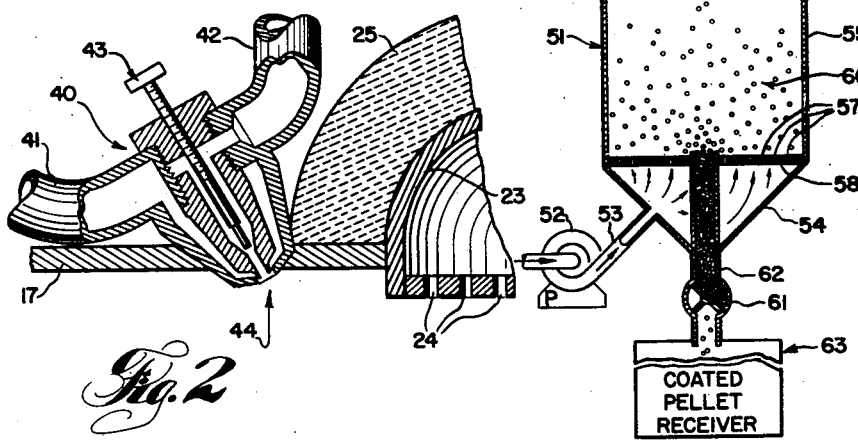

In the drawings:

FIG. 1 is a substantially diagrammatic vertical view of apparatus for carrying out the process of the invention and illustrates by a vertical cross-sectional view a fragmentary portion of the apparatus including the excess particle-remover column and the pelletizing column enclosing the upper and lower fluidized beds; and FIG. 2 is a vertical cross-sectional view of a fragmentary portion of the apparatus of FIG. 1 including the means for introduction of the liquid spray of atomized droplets.

Referring to FIGS. 1 and 2, the apparatus comprises a pelletizing column, generally designated 10, which includes an upper cylindrical section 11, a lower cylindrical section 12 of smaller diameter than upper section 11, and a tapered transitional section 13, which joins and blends lower section 12 into upper section 11. An auxiliary cooling jacket 14 surrounds sectons 11, 12, and 13. A coolant, not illustrated, enters cooling jacket 14 through pipe 15, flows through the jacket 14 to assist in maintaining the temperatures in sections 11, 12, and 13, and exits through pipe 16. The upper end of column 10 is closed substantially by top plate 17.

A supply of fusible material 18 is introduced through pipe 19 into a feed tank 20 which is jacketed with a suitable means, such as heater means 21 for maintenance of material 18 in a molten state. Heater means 21, as illustrated in FIG. 1, comprises electrical resistance elements 21a. Material 18, when valve 22 is opened, flows downward from tank 20 into showerhead 23 and passes through a plurality of small orifices 24 in showerhead 23. Insulation 25 surrounds valve 22 and pipe 26 leading from tank 20 to showerhead 23. Top plate 17 abuts showerhead 23 in such a manner that orifices 24 open into the top of column 10. Material 20 issues from orifices 24 downwardly in the form of molten droplets 27 and/or discrete streams which break up into molten droplets 27 a short distance away from orifice 24.

An upper fluidized bed 28 of finely divided coating solids or particles 29 is maintained within the column 10 with the approximate upper free surface of the fluidized bed designated by dotted line 30. Droplets 27 fall freely downward through a substantially particle-free area for a short distance before passing through upper free surface 30. The amount of cooling and subsequent partial congealing of the droplets 27 as they fall for this short distance before entering surface 30, has an effect on the subsequent coated pellet and the amount of particle coating. Control of the amount of cooling is possible by varying this short free-fall distance of the droplets 27. This distance may be varied by raising or lowering of the showerhead 23 by a means not illustrated, or may be varied by changing the volume of the upper fluidized bed 28 by addition or removal of amounts of particles 29 with a subsequent raising or lowering of the location of upper free surface 30. Because of the relative size and density of droplets 27 in comparison to particles 29, the droplets proceed in a general downward direction through fluidized bed 28. Droplets 27 during passage through bed 28 obtain a coating of particles 29 thereon and congeal further to provide partially or substantially congealed, coated droplets 27'.

Coated droplets 27' after proceeding through bed 28 enter a lower fluidized bed 31 of coated pellets or droplets 27' and are assimilated into bed 31. Lower fluidized bed 31 merges into upper fluidized bed 28 at or near the connection of lower section 12 with tapered transitional section 13. The upper free surface of bed 31 in general coincides with the lower free surface of bed 28, with the approximate location of both of these surfaces designated by the dotted line 32. The lower free surface of lower bed 31 coincides in general with the upper surface of a gas distributor plate 33 located in the lower region of lower section 12.

A fluidizing gas, whose flow is indicated by solid arrows, after being brought to a suitable velocity by pump 34, proceeds through conduit 35 into a conical gas plenum section 36 which is joined to the lower edge of lower cylindrical section 12. The fluidizing gas flows through gas plenum section 36, upward through small holes or perforations 37 in gas distributor plate 33, through lower fluidized bed 31, through upper fluidized bed 28, and exits from column 10 through conduit 38 at the top of column 10. Fluidization of both lower and upper fluidized beds 31 and 28 is maintained by the upwardly flowing fluidizing gas that passes through both.

In the drawings a pneumatic atomizing nozzle, generally designated 40, functions as a means for introducing a liquid spray of atomized droplets. In the nozzle, an atomizing gas enters through conduit 41 and a liquid enters through conduit 42. A shut-off needle assembly 43 is provided for controlling and shutting off the liquid fed into the nozzle 40. The atomizing gas and the liquid, with the shut-off needle assembly 43 in the illustrated open position, mix internally within the nozzle 40 near an orifice 44 and exit from orifice 44 as a round spray 45. Round spray 45 comprises a conically shaped spray of atomized liquid droplets. Spray 45 is directed substantially downwardly toward the central area of upper free surface 30. Nozzle 40 and top plate 17 abut each other in such a manner that orifice 44 opens into the upper region of upper cylindrical section 11 and directs round spray 45 substantially toward a central area of upper free surface 30.

Removal of coated pellets 27' from bed 31 either periodically or continuously is brought about by a downward removal through valve 49 of coated pellets that collect in a stand-pipe 50. Stand-pipe 50 runs through the apex of conical gas plenum section 36 and through distributor plate 33 into fluidized bed 31. Substantial congealing and cooling of the coated droplets or pellets 27' occur in bed 31 and the coated pellets 27' removed from this bed are substantially free from loosely adhering coating particles and congealed sufficiently to be resistant to deformation from routine handling. From valve 49 the coated pellets 27' drop into an excess particle remover column 51. Alternatively, from valve 49 the coated pellets may be directed to a coated pellet receiver by a means not illustrated, if it is not desired to remove extremely small amounts of particles loosely adhering to the coated pellets.

Excess particle remover column 51 comprises a blower 52 for introducing a fluidizing gas through a conduit 53 which connects to a conical gas plenum section 54. Gas plenum section 54 connects to a cylindrical section 55 having a top plate 56 through which stand-pipe 50 passes. The fluidizing gas flows from conduit 53 through gas plenum section 54 and upwardly through small holes or perforations 57 in a gas distributor plate 58 which is located at or near the connection of section 54 to section 55. From the distributor plate 58, the gas flows upward with entrained traces of particles 29 and exits through conduit 59 near the top of section 55. Above distributor plate 58 the upwardly flowing fluidizing gas maintains a fluidized bed 60 of coated pellets 27'. The velocity of the fluidization gas generally is sufficient to provide a violent or turbulent fluidized bed of coated pellets 27'. The gas velocity is maintained below the setting velocity of the coated pellets 27' and above the settling velocity of the particles 29. Coated pellets dropping from stand-pipe 50 pass into this fluidized bed 60 of pellets and are rapidly assimilated into bed 60. The upper free surface of fluidized bed 60 is maintained below the level of conduit 59 by controlling the amount of coated pellets 27' removed from bed 60 and the flow of fluidizing gas. Removal of coated pellets 27' from bed 60 either periodically or continuously is brought about by a downward removal through valve 61 of pellets 27' that collect in a stand-pipe 62. Stand-pipe 62 runs through the apex of conical gas plenum section 54 through distributor plate 58 into fluidized bed 60. From stand-pipe 62, the coated pellets drop into a coated pellet receiver 63 of suitable size.

Fluidizing gases and any particles 29 entrained therein, leaving column 10 through conduit 38 and column 51 through conduit 59, are joined and pass through a common conduit 64 which connects to a particle collector means 65. Particle collectors, such as conventional cyclone separators, for separation of entrained solids from gases, may be employed, if desired, in place of the illustrated means 65. A reversed blower 66 connected to particle collector means 65 assists in the removal of the existing gases from columns 10 and 51 and their transfer to means 65. Fluidizing gases exhausted by reverse blower 66 may, if desired, be cooled and recirculated through blowers 34 and/or 52 by means not illustrated. Particles 29 collected in means 65 fall into and accumulate in a lower conical portion 67 of means 65. The collected particles 29 upon opening of a valve 68 pass through conduit 69 to an elevator 70 for recirculation of particles to the upper fluidized bed 28 of column 10. A supply of coating particles 29 is provided in a container 71. By gravity feed, these particles 29 upon opening of a valve 72 pass through a conduit 73 to elevator 70. Elevator 70, by a mechanical means or other suitable means not illustrated, lifts particles 29 to an elevation higher than column 10 and permits sufficient particles 29 to replenish fluidized bed 28 to pass through a conduit 74 and enter column 10. The flows of fluidized particles 29 from container 71 and collector means 65 to column 10 are illustrated by broken-line arrows. The particles 29 entering column 10 are deflected and directed downward into the bed 28 by a baffle plate 75 extending downwardly from top plate to slightly below upper free surface 30. Alternatively, the particles entering column 10 may be deflected and directed downward into the bed 28 by means of an extension (not illustrated) of conduit 74 that extends slightly below upper free surface 30.

The type of liquid spray which may be employed is dependent on the temperature of the fluidized bed of finely divided solids. The spray may comprise coarse droplets and even fine streams of the liquid when this temperature is above the boiling point of the liquid. When the bed temperature is lower than the boiling point of the liquid, the spray should comprise fine droplets to avoid agglomeration of finely divided solids. The fine droplets generally are of varied minute particle sizes. The particle size of the droplets depends on many factors including the nature of the spray liquid and the means for producing the spray. Such things as capacity, spray angle, pressure, orifice size and shape for various types of nozzles all affect the particle size. With the temperature of the fluidized solids bed below the boiling point temperature of the liquid, the maximum particle size of the liquid droplets should not exceed about 1000 microns. Generally, a maximum liquid-droplet particle size of less than 200 microns is preferred. Liquid-droplet particle sizes as small as several microns may be employed and generally a range of droplet particle sizes is employed. For water, the maximum particle size preferably does not exceed 200 microns with a median particle size within the range of 50 to 100 microns.

The quantity of a particular liquid spray which may be employed is dependent on the process conditions and the fluidizing gas. The liquid-droplet particle size, the quantity of fluidizing gas passing from the pelletizing column, and the temperatures within the column all affect the quantity and rate of addition of the liquid spray. The quantity and rate of addition of the liquid spray must not be so large as to permit the fluidizing gas to exceed the dew point of the gas within the column. Should this dew point be exceeded, agglomeration of the finely divided coating solids occurs.

Choice of the type of spray and size and type of nozzle may be made from among known devices with due regard for the factors determinative of the type and configuration of the spray thus produced, the particle size of the liquid droplets, and the required quantity and rate of addition of the spray for the particular pelletizing column. Preferably, the atomizing means provides a uniform spray of a narrow range of droplet particle sizes in such a manner as to direct the spray to the central area of the upper free surface of the fluidized solids bed without portions of the spray contacting the interior of the pelletizing column. Preferably a gas atomizing nozzle is employed to provide a round or conical spray with the atomizing gas being the same, or of the same nature, as the fluidizing gas.

The following specific examples were carried out with an apparatus of the type illustrated in FIGS. 1 and 2. The tank holding the fusible material had a capacity of about 20 gallons. In the pelletizing column, the large diameter upper cylindrical section was 17 inches inside diameter by about 36 inches high and the small diameter lower cylindrical section was 7.6 inches inside diameter by about 12 inches high. The cylindrical section of the excess particle remover column was 5.9 inches inside diameter by about 72 inches high. The showerhead comprised a circular plate about 2½ inches in diameter by 1/16 inch thick with a total of 32 uniformly spaced orifices, each 0.026 inch in diameter. The gas distributor plate was about ¼ inch thick with a total of 48 uniformly spaced holes or perforations, each 0.25 inch in diameter. The nozzle for introduction of the liquid spray of atomized droplets was a round spray atomizing nozzle, such as ¼ JN Nozzle Set-Up No. 1A with fluid nozzle No. 1650 and air nozzle No. 64, as sold by Spraying Systems Company, Bellwood, Illinois. Such a nozzle with water and an air pressure of 60 p.s.i. produces a conical spray having a spray angle of 18° and a defined conical spray configuration for about 14 inches. Such a nozzle with water and air at a pressure of less than 1 p.s.i. produces liquid droplets having particle sizes below 10 microns.

Example I

Thirty pounds of finely divided clay having a mean average particle size of 18 microns and ranging in size from 5 to 80 microns were added to the pelletizing column. Air at atmospheric temperature was introduced into the gas plenum section to provide a volumetric air flow of 0.65 cubic feet per second (equivalent to a linear air flow of about 2.2 feet per second) through the distributor plate, and molten rosin at a temperature of about 151° C. was introduced through the showerhead orifices into the pelletizing column. Water was employed in the nozzle to direct a spray of atomized droplets on the upper free surface of the bed of fluidized clay particles. Within a few seconds a sufficient amount of coated pellets reached the lower cylindrical section to provide a fluidized bed of coated pellets. At this time the air velocity in the upper bed of fluidized clay particles was 0.42 feet per second. Visual examination showed distinct upper and lower fluidized beds with the upper free surface of the fluidized clay bed about 20 inches below the showerhead orifices. Samples of clay particles withdrawn from the fluidized clay bed during the process run had moisture contents ranging from 7.3 to 8.5 percent by weight. Moisture contents were measured by a Cenco moisture balance (Catalog No. 26675, Cenco Scientific Co., Chicago, Illinois). As the amount of clay-coated rosin pellets increased in the lower fluidized bed, a portion of these coated pellets was withdrawn through the stand-pipe, so as to control the level of the upper free surface of the lower fluidized bed. The temperature of the lower fluidized bed ranged from 97 to 107° F. The amount of the molten rosin introduced through the showerhead orifices was about 147 pounds per hour. From 8.3 to 9.0 pounds per hour of water having a temperature of about 60° F. was introduced through the spray nozzle with an atomizing air pressure of 60 p.s.i. As the surface of the fluidized clay bed dropped to a lower level in the column due to diminution in the amount of clay, additional amounts of clay (about 30 pounds per hour) were supplied to the upper bed to raise the upper free surface to its position about 20 inches below the showerhead orifices. Coated pellets remained in the lower fluidized bed about 6 minutes.

The pelletized product that was withdrawn from the stand-pipe extending to the lower fluidized bed consisted essentially of substantially spherical, clay-coated, rosin pellets. The clay content of the pellets ranged from 6.3 to 7.5 percent and averaged 6.7 percent by weight with an average loose clay content of about 1 percent by weight. Over 85 percent by weight of the pellets was from minus 8 to plus 16 mesh (U.S. Bur. Stds, sieve series). An average of 165 pounds per hour of coated pellets was obtained over a two-hour period.

By passing the pelletized product that was withdrawn from the stand-pipe extending into the lower fluidized bed through the excess of particle removed column of the apparatus, a superior dust-free product was obtained. Air at atmospheric temperature with a velocity of 3.9 feet per second was admitted into the gas plenum section of the excess particle remover column. Within a few seconds, a sufficient amount of pellets reached this column to provide a turbulent fluidized bed of coated pellets whose upper surface was lower than the conduit for the exiting air. Pellets were admitted and withdrawn to this fluidized bed through the respective stand-pipes at a rate to maintain this upper surface below the level of the conduit for the exiting air. Retention time for the coated pellets in this turbulent fluidized bed was about 6 minutes. The substantially spherical pelletized product from the excess particle removed columns was substantially dust-free, with the rosin pellets uniformly coated with clay particles.

Example II

For comparison purposes a process run was made with rosin as the fusible material and clay particles at substantially the same conditions as in Example I, except that no liquid spray was introduced. It was not possible to introduce the molten rosin at a rate greater than about 60 pounds per hour and maintain an operative process. At higher rates the fluidized clay bed temperatures ranged as high as 150° F. and agglomeration of molten droplets into clusters of droplets occurred. When the rate of introduced molten rosin was 30 pounds per hour, the temperature of the fluidized clay bed was 130° F. At these conditions the maximum rate of coated pellets that was obtained was 33 pounds per hour or only about one-fifth the rate of production obtained in Example I, which employed the liquid-spray direct cooling of the invention for the fluidized bed of finely divided coating solids.

Example III

Additional process runs were made with rosin as the fusible material and clay particles as the coating particles at substantially the same conditions as in Example I, except that the introduced amounts of molten rosin were varied. When the ratio by weight of molten rosin droplets to fluidized clay particles in the upper fluidized bed was about 1:0.3 the process was inoperable due to agglomeration of droplets into clusters. When the rosin-to-clay ratio was greater than 1:1, poor results were obtained, in that occasional agglomeration occured. At lower rosin-to-clay ratios, in particular at ratios of 1:2 up to 1:20, very satisfactory, substantially spherical, uniformly clay-coated rosin pellets were obtained. Optimum results were obtained at a 1:5 ratio in that the process proceeded readily with little or no difficulty.

Example IV

Additional process runs were made with rosin as the fusible material and clay particles as the coating particles at substantially the same conditions as Example I, except that the liquid-spray feed and the coolant flow were varied to alter the upper fluidized bed temperature. By varying the maintained fluidized bed temperature from 20° to 120° C., it was possible to increase the amount of clay coating on the rosin pellets from as low as about 2 percent to as high as about 80 percent by weight in some runs at the high temperatures.

Example V

Under substantially the same conditions as those of Example I there may be prepared coated rosin pellets having finely divided zein as the coating particles. Zein particles of a size capable of passage through a 150-mesh sieve (U.S. Bur. Stds. sieve series) may be used. Such a pelletized product will consist of substantially spherical, zein-coated, rosin pellets ranging in size from 1/16 inch to 3/16 inch in diameter with a mean average diameter of 1/8 inch. The zein content of such pellets will average about 20 percent by weight with an average loose zein content of less than 0.5 percent by weight after passage through the excess particle remover column.

*Example VI*

Molten ammonium nitrate at a temperature of about 175° C. in place of molten rosin in a process under substantially the same conditions as those of Example I will provide a pelletized product consisting of clay-coated, ammonium nitrate pellets. Such a product will consist of substantially spherical pellets ranging in size from 1/32 inch to 3/32 inch in diameter with a mean average diameter of 1/16 inch. The clay content of these pellets will average about 2 percent by weight with a loose clay content of less than 0.5 percent by weight after passage through the excess particle remover column.

*Example VII*

Additional process runs were made with rosin as the fusible material and clay particles as the coating solids according to the general procedure of Example I, with the amounts of introduced spray varied, streams or droplet particle sizes of the liquid spray varied, and the location and direction of the liquid spray varied.

In the process runs wherein the amounts of introduced spray were varied, when the rate of addition exceeded a definite limit apparently depending on the flow of the fluidizing air and the temperature within the column, agglomeration of the clay particles in the fluidized clay bed occurred to render the process inoperable. Samples of the fluidizing gas exiting from the fluidized clay bed at this time showed that the dew point of the fluidizing air had been exceeded.

In the process runs wherein fine streams of the liquid spray were used, unless the temperature of the fluidized bed of clay particles exceeded the boiling point of the liquid, agglomeration of clay particles occurred. In the process runs wherein the temperature of the fluidized bed of clay particles was below the boiling point of the spray liquid, unless the liquid spray droplets were smaller than 1500 microns, sufficient agglomeration of the fluidized clay bed occurred to render the coating-pelletizing process inoperable.

In the process runs wherein the liquid spray was directed to impinge at least in part on the molten droplets prior to passage of the molten droplets through the upper free surface of the fluidized clay bed, the produced coated pellets had decreased clay coating contents. In the process runs wherein the liquid spray was directed countercurrently upward in the upper regions of the fluidized clay bed, the coated pellets were nonuniformly coated with such pellets exhibiting a significantly heavier coating over about one half of the pellet surface. In the process runs wherein the liquid spray was directed in the same direction, or substantially the same direction, as the downward direction of the molten rosin droplets, the coated pellets were substantially spherical and exhibited a uniform coating of clay particles.

Various changes and modifications of the invention will be obvious to those skilled in the art. It is desired to include all such changes and modifications that fall within the true spirit and scope of the invention and to limit the invention only as set forth in the appended claims.

What is claimed is:

1. In the preparation of substantially spherical pellets of a fusible material having a coating of discrete solid particles of finely divided coating solids adhering thereto by the process comprising dropping molten droplets of said fusible material downwardly through an upper free surface of a fluidized bed of finely divided coating solids of a particle size smaller than the size of said molten droplets and downwardly through said fluidized bed, the fusible material characterized as a liquid at elevated temperatures and a solid at atmospheric temperatures, the fluidized bed being at a temperature lower than the liquefaction temperature of said finely divided coating solids and lower than the temperature of said dropping droplets, and concurrently therewith a stream of a fluidizing gas having a temperature lower than said temperature of said dropping droplets flowing upwardly through said fluidized bed to maintain said finely divided coating solids in a fluidized condition, the improvement of the steps in combination therewith of: spraying droplets of a liquid vaporizable at a temperature less than the liquefaction temperature of the fusible material downward onto an upper free surface of the fluidized bed of finely divided coating solids in an amount of the sprayed droplets insufficient to exceed the dew point of the upwardly flowing fluidizing gas with said sprayed atomized droplets of a particle size less than 1000 microns when the temperature of the fluidized bed is lower than the boiling point of said liquid; vaporizing the sprayed droplets; and removing vaporized droplets together with the fluidizing gas passing from the fluidized bed of said coating solids.

2. A process for preparing substantially spherical, solid rosin pellets with a uniform, adherent coating of discrete solid particles of finely divided clay, the process comprising: producing molten droplets of rosin having a temperature higher than the melting point of the rosin; introducing the molten droplets in the top of a pelletizing column for downward passage through the column, the column comprising an upper region and a lower region having a cross-sectional area smaller than the cross-sectional area of the upper region; introducing air at atmospheric temperatures into the lower region of the pelletizing column for upward flow through the column; introducing finely divided clay particles smaller than the molten droplets and capable of passage through a U.S. No. 70-mesh sieve into the upper region of the column, the upwardly flowing air in the upper region of the column maintaining therein a fluidized bed of the finely divided clay; spraying atomized droplets of water of a particle size less than 200 microns downward onto an upper free surface of the fluidized bed of said clay with an amount of sprayed droplets insufficient to exceed the dew point of the upwardly flowing air in said upper region to maintain the fluidized bed of said clay at a temperature between 20° to 120° C.; coating the molten droplets with particles of the finely divided clay during downward passage through the fluidized bed of said clay with the amounts of introduced molten droplets of rosin to finely divided clay maintained within a 1:2 to 1:20 ratio within said bed of said clay; collecting the coated droplets in the lower region of the column with the upwardly flowing air in the lower region of the column maintaining therein a fluidized bed of the coated droplets; withdrawing portions of the coated droplets from the fluidized bed of said coated droplets, the withdrawn portions of the coated droplets consisting essentially of the substantially spherical, solid rosin pellets with a uniform, adherent coating of discrete solid particles of the finely divided clay.

3. The process of claim 2 in which the sprayed atomized droplets of water are of a particle size less than 200 microns with the median particle size between 50 to 100 microns and including passing and assimilating the withdrawn portions of the coated droplets into a fluidized bed of coated pellets maintained in a turbulent fluidized condition by air flowing therethrough, and withdrawing coated pellets from the fluidized bed of the coated pellets with the withdrawn coated pellets consisting essentially of a substantially dust-free, substantially spherical, solid rosin pellet having a uniform, adherent coating of the finely divided clay.

(References on following page)

References Cited in the file of this patent

UNITED STATES PATENTS

| | | |
|---|---|---|
| 1,627,863 | O'Neil | May 10, 1927 |
| 1,782,038 | Haak | Nov. 18, 1930 |
| 2,059,983 | Dent et al. | Nov. 3, 1936 |
| 2,186,659 | Vogt | Jan. 9, 1940 |
| 2,484,792 | Mollring | Oct. 11, 1949 |
| 2,644,769 | Robinson | July 7, 1953 |
| 2,768,095 | Tadema et al. | Oct. 23, 1956 |
| 2,811,748 | Smith | Nov. 5, 1957 |
| 2,844,489 | Gemmer | July 22, 1958 |
| 2,865,868 | McKinley et al. | Dec. 23, 1958 |
| 2,938,233 | Nack et al. | May 31, 1960 |

OTHER REFERENCES

Othmer: Fluidization, Reinhold Publishing Corp., New York, 1956, pp. 212–215 and 220–223.